United States Patent
Ackley et al.

(10) Patent No.: US 8,221,718 B2
(45) Date of Patent: Jul. 17, 2012

(54) SILVER-EXCHANGED ZEOLITES AND METHODS OF MANUFACTURE THEREFOR

(75) Inventors: Mark William Ackley, East Aurora, NY (US); Philip A. Barrett, Kenmore, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 12/636,146

(22) Filed: Dec. 11, 2009

(65) Prior Publication Data

US 2010/0095849 A1   Apr. 22, 2010

Related U.S. Application Data

(62) Division of application No. 12/255,018, filed on Oct. 21, 2008, now Pat. No. 7,662,213.

(51) Int. Cl.
*B01J 29/06* (2006.01)
(52) U.S. Cl. ............... 423/717; 96/121; 96/132; 502/65
(58) Field of Classification Search .................. 422/169; 95/90; 585/809; 502/65
See application file for complete search history.

(56) References Cited

U.S. PATENT DOCUMENTS

| | | | |
|---|---|---|---|
| 3,108,706 A | 10/1963 | Matsch et al. | |
| 3,405,057 A * | 10/1968 | Neuzil et al. ............... 208/310 R |
| 3,437,601 A | 4/1969 | Skala et al. | |
| 3,807,149 A | 4/1974 | Norback | |
| 3,969,276 A | 7/1976 | Rosback | |
| 4,019,880 A | 4/1977 | Rabo et al. | |
| 4,544,378 A | 10/1985 | Coe et al. | |
| 5,019,263 A | 5/1991 | Haag et al. | |
| 5,470,557 A | 11/1995 | Garney | |
| 5,804,526 A | 9/1998 | Satoh et al. | |
| 6,027,707 A | 2/2000 | Casci et al. | |
| 6,337,063 B1 | 1/2002 | Rouleau et al. | |
| 6,432,170 B1 | 8/2002 | Chiang et al. | |
| 6,572,838 B1 | 6/2003 | Sebastian et al. | |
| 6,583,081 B2 | 6/2003 | Seff et al. | |
| 6,780,806 B1 | 8/2004 | Yang et al. | |
| 6,887,444 B1 | 5/2005 | Yamamoto | |

(Continued)

FOREIGN PATENT DOCUMENTS

EP    0 170 884 A1    1/1986

(Continued)

OTHER PUBLICATIONS

Bolton, A.P., "Molecular Sieve Zeolites," in Experimental Methods in Catalytic Research, vol. II, ed. R.B. Anderson and P.T. Dawson, Academic Press, New York 1976.

(Continued)

*Primary Examiner* — Duane Smith
*Assistant Examiner* — Amber Orlando
(74) *Attorney, Agent, or Firm* — Iurie A. Schwartz

(57) ABSTRACT

The present invention relates generally to zeolites having a silica/alumina ratio of less than or equal to 10 (Si/Al≦10) that are exchanged with $Ag^+$ and thermally treated in such a way to favor adsorption over alternative catalytic and chemically reactive functionalities. The adsorbents of the present invention and the method of producing such adsorbents maximize the working adsorption capacity through π-complexation. Applications for such adsorbents include any process in which contaminants from gas streams can form π-complexes with the Ag in the zeolite, particularly the removal of CO, ethylene, propylene and the like from air and $CO/H_2$ from air in prepurifier adsorbers in the production of ultra high purity (UHP) $N_2$.

10 Claims, 6 Drawing Sheets

U.S. PATENT DOCUMENTS

| | | | |
|---|---|---|---|
| 6,936,232 B2 | 8/2005 | Gillespie et al. | |
| 7,041,272 B2 | 5/2006 | Keefer et al. | |
| 7,374,728 B2 | 5/2008 | Nakanishi et al. | |
| 7,399,326 B2 | 7/2008 | Zhang et al. | |
| 7,455,718 B2 * | 11/2008 | Ackley et al. | 95/90 |
| 7,524,358 B2 | 4/2009 | Saxena et al. | |
| 2002/0098394 A1 * | 7/2002 | Keefer et al. | 429/13 |
| 2003/0163013 A1 * | 8/2003 | Yang et al. | 585/823 |
| 2006/0090646 A1 | 5/2006 | Sawada et al. | |
| 2006/0210454 A1 * | 9/2006 | Saxena et al. | 422/169 |
| 2007/0000382 A1 * | 1/2007 | Ackley et al. | 95/90 |

FOREIGN PATENT DOCUMENTS

| | | |
|---|---|---|
| JP | 61-293548 | 12/1986 |
| WO | WO 03/101587 A1 | 12/2003 |

OTHER PUBLICATIONS

Huang, Yun-Yang, "Adsorption in AgX and AgY Zeolites by Carbon Monoxide and Other Simple Molecules" (J. Catal., V32, 482-491, 1974).43.

Bugbee, A. Textbook of Fire Assaying, Third Edition, John Wiley & Sons, New York, 1940.

Calzaferri, et al. (Chem. Soc. Rev., 2003, V32, 29-37).

* cited by examiner

US 8,221,718 B2

SILVER-EXCHANGED ZEOLITES AND METHODS OF MANUFACTURE THEREFOR

CROSS-REFERENCE TO RELATED APPLICATION

The present invention is a divisional of U.S. divisional application Ser. No. 12/255,018, filed Oct. 21, 2008 now U.S. Pat. No. 7,662,213, which claims priority to U.S. nonprovisional patent application Ser. No. 11/170,104, filed Jun. 30, 2005, the entire contents of which are incorporated herein by reference in its entirety.

TECHNICAL FIELD

The present invention relates generally to zeolites having a silica/alumina ratio of less than or equal to 10 (Si/Al<10) that are exchanged with $Ag^+$ and thermally treated in such a way to favor adsorption over alternative catalytic and chemically reactive functionalities. The adsorbents of the present invention and the methods of producing such adsorbents maximize the working adsorption capacity through π-complexation. Applications for such adsorbents include any process in which contaminants from gas streams can form π-complexes with the Ag in the zeolite, particularly the removal of CO, ethylene, propylene and the like from air and $CO/H_2$ from air in prepurifier adsorbers in the production of ultra high purity (UHP) $N_2$.

BACKGROUND OF THE INVENTION

There is a need to remove and/or recover contaminants from industrial process gas streams. Separation by adsorption is generally preferred over catalytic and reactive methods since reaction byproducts can be avoided and regeneration/reuse of the adsorbent is possible. There is a certain class of contaminants that are very weakly adsorbed in zeolites containing alkali and alkaline earth cations, but the adsorption of such contaminants can be greatly enhanced by exchange with Cu, Ag or Au. This enhancement arises when the physisorption forces are significantly augmented by chemisorption through π-complexation. Molecules of such a class are small enough to enter the zeolite structure and possess an electron structure that easily forms π-bonds with the cations in the zeolite, e.g. carbon monoxide (CO), ethylene ($C_2H_4$), propylene ($C_3H_6$), etc.

The equilibrium adsorption capacity of CO in AgX and AgY was measured by Huang (J. Catal., v32, 482-491, 1974) as pure component isotherms. About 1.0 mmol/g CO is adsorbed on AgX powder at an equilibrium pressure of 0.1 torr and 25° C. Similar amounts of $N_2$ are adsorbed at pressures above 100 torr. While this CO equilibrium capacity is attractive, these data do not confirm the utility of such materials in real processes designed for removal and/or recovery of CO or other contaminants of interest. More particularly, the working capacity of CO reflecting coadsorption of competitive components in the gas stream and the adsorption kinetics in agglomerated zeolites must be considered. The mass transfer front characteristics and the presence of adsorption inhibitors such as oxidation and reduction agents are also important considerations in practical applications.

One example of these real process effects is the removal of CO from air at normal ambient temperatures. CO and $H_2$ are present in atmospheric air at concentrations of approximately 0.5 ppm to 10.0 ppm. $H_2$ may act as a reducing agent to $Ag^+$, while $O_2$ (about 21 vol %) acts as an oxidizing agent and is also coadsorbed along with $N_2$. Thus, $H_2$ and $O_2$ can be deactivating agents with respect to the $Ag^+$ cation, while $O_2$ and $N_2$ compete for adsorption space with the CO. In addition, at low concentrations of CO, the CO mass transfer front is diffuse and spreads over the entire adsorbent bed, i.e. with no apparent equilibrium zone. For these reasons, the equilibrium CO capacity data obtained from pure component isotherms is of limited value in predicting the effectiveness of an adsorbent for CO removal from an actual process stream.

In addition, large scale adsorbent processing introduces variables and problems absent from laboratory or bench-scale processing such that the production of large quantities of adsorbent with desirable properties is not guaranteed. Some of the problems inherent in processing large quantities of solid materials include uniformly mixing and heating the solid, the distribution of purge flow, purge/solid contact, rapid elimination of water vapor and disposal of waste solutions. Other issues include the costs of dry contaminant-free purge gas, exchange solutions and deionized wash water and the capital equipment required to handle large quantities of solids. Moreover, prior art techniques demonstrate high variability and lack of consistency in performance of such materials.

Given the numerous types of aluminosilicate zeolites combined with variations in Si/Al ratio and charge-balancing cations, much literature on zeolites has been developed. The primary purpose of such technical literature is to demonstrate the synthesis of the material and to characterize its physical, chemical and adsorptive/catalytic properties. Conditions and practices typical in such teachings are the use of gram quantities of adsorbent processed (often in powder form), use of ion exchange solution(s) and deionized wash water in large excess relative to the quantity of adsorbent and minimal requirement for disposal of waste chemicals. Very slow heating is typically applied in combination with large amounts of dry inert purge or evacuation during thermal activation of the material. Such practices are neither economical nor practical for industrial scale production of the adsorbent or catalyst.

The prior art recognizes a number of applications for Ag-exchanged zeolites, e.g. scavenging of $H_2$ from vacuum spaces, $Ar/O_2/N_2$ separations, as a bactericide in water purification and separation of liquid phase aromatic hydrocarbon isomers.

Matsch, et al. (U.S. Pat. No. 3,108,706) describes AgX zeolite for use as a $H_2$ getter in maintaining the vacuum insulated annulus space of cryogenic storage containers. In this application, $H_2$ is removed by chemical reaction with the Ag-exchanged zeolite, i.e. the $Ag^+$ and/or excess $Ag_2O$ contained in the zeolite are reduced by the $H_2$.

Rosback (U.S. Pat. No. 3,969,276) provides a method of manufacturing an adsorbent comprising ion exchanging either an X or Y zeolite with cations from Group IA, IIA and IB of the Periodic Table. The preferred adsorbent is BaX or BaKX for separating liquid phase mixtures of hydrocarbons.

Chiang, et al. (U.S. Pat. No. 6,432,170) describe a LiAgX zeolite with a silver exchange level from 20% to 70% for separation of $Ar/O_2$ gas mixtures. The aim of this invention is to produce an adsorbent with enhanced Ar selectivity over $O_2$ at a reduced cost (by minimizing the silver content).

A method for preparing AgA zeolite with adsorptive selectivity of $N_2$ over $O_2$ in air and Ar over $O_2$ is disclosed in U.S. Pat. No. 6,572,838 to Sebastian, et al. A single step ion exchange process using an aqueous solution of any silver salt is said to create an adsorbent insensitive to hydroxylation.

U.S. Pat. No. 4,019,880 to Rabo et al. discloses Ag-exchanged zeolites with a high affinity for CO in the presence of water vapor and $CO_2$. Zeolites preferred by this invention include the high silica zeolites of the ZSM-series having $20 \leq SiO_2/Al_2O_3 \leq 200$. Although tolerant to $H_2O$ and $CO_2$, these zeolites are subject to deactivation by $H_2$ as the $Ag^+$ cations are reduced by $H_2$.

Coe, et al. (U.S. Pat. No. 4,544,378) relates to a CaX zeolite for air separation, attempting to avoid the damaging effects of both zeolite framework and cation hydrolysis through special attention to the thermal activation step in processing of the adsorbent. LiAgX zeolites are disclosed for $N_2$ adsorption in air separation in U.S. Pat. No. 6,780,806 by Yang et al. Preferred formulations include Si/Al=1.0 with Ag<20% of exchangeable cations. The increased $N_2$ adsorption capacity is attributed to the supplementary weak chemical bonds formed between $N_2$ and Ag clusters due to π-complexation. It is suggested, however, that fully exchanged AgX is not favorable for adsorptive separation due to strong adsorption of $N_2$ at low pressure, resulting in difficulty in desorbing the $N_2$ for regeneration of the adsorbent.

Ag-exchanged zeolites created for applications such as gettering of $H_2$ (U.S. Pat. No. 3,108,706) are thermally treated to reduce, react and/or activate the Ag, resulting in the destruction of part or most of the micropore volume of the zeolite. Thus, catalytic or chemical reactive functions are promoted at the expense of adsorption capacity.

With few exceptions, the prior art implicitly assumes that the adsorption characteristics resulting from bench-scale processing of ion exchanged zeolites prepared for gas separations are automatically reproducible in large-scale manufacture. Such thinking completely ignores the physical and economic limitations in processing industrial-scale quantities of zeolites. Ion exchange, drying and thermal activation steps, each involving heat and mass transfer, do not scale linearly from the gram quantities of adsorbents typical of lab-processing to the large kg quantities required for efficient manufacture. As mentioned above, prior art techniques demonstrate high variability and lack consistency in performance of such materials.

In addition, the high cost of Ag used in the ion exchange solutions, the disposal of their waste and the costs of providing dry purge gas cannot be ignored in large-scale manufacture.

Commonly owned PCT international publication No. WO 03/101587 A1, entitled "Production of High Purity and Ultra-High Purity Gas", discloses the use of Ag-exchanged zeolites for removing CO in air separation plant prepurifiers. The entire contents of PCT international publication No. WO 03/101587 are incorporated herein by reference.

While the prior art provides several examples of Ag-exchanged zeolites for a variety of separations, the prior art lacks high performance adsorbents exhibiting consistently high dynamic capacity for gas molecules receptive to π-complexation such as CO, $C_2H_4$, $C_3H_6$ and the like.

It would thus be desirable to consistently provide adsorbents that achieve high working capacity as well as perform well in the presence of high concentrations of gases that would normally be strongly coadsorbed by physisorption ($N_2$, $O_2$, $CO_2$, etc.) or in the presence of strong reducing (e.g. $H_2$) and oxidizing (e.g, $O_2$) agents.

BRIEF SUMMARY OF THE INVENTION

The present invention provides adsorbents and methods of manufacture therefor in which the adsorbents demonstrate improved, consistent and reproducible working capacity characteristics. The adsorbents can be used in the presence of high concentrations of gases that would typically be strongly coadsorbed by physisorption ($N_2$, $O_2$, $CO_2$, etc.). The adsorbents of the present invention also have improved performance characteristics in the presence of strong reducing (e.g. $H_2$) and oxidizing (e.g., $O_2$) agents.

The unique characteristics of the adsorbents of the present invention are achieved from a combination of factors including: the selection of zeolites with Si/Al<10, high $Ag^+$ exchange (e.g., $\geq 80\%$), control of the excess Ag and other contaminants deposited in the pores of the zeolite, controlling the moisture content to $\leq 2.0$ wt % and maximizing retention of micropore volume (for example, $\geq 85\%$). More specifically, the adsorbents of the present invention are characterized by limiting hydrothermal structural damage (i.e., destruction of micropore volume) to no more than 15%. These properties are largely achieved through the proper combination of processing conditions practical for industrial scale production. The desired processing conditions of the present invention avoid practices common in the prior art such as pretreatment of the zeolite with caustic solution, vacuum activation, rapid heating and static oven activation.

As mentioned above, one aspect of the adsorbents of the present invention are zeolites with Si/Al<10 and at least 80% of exchangeable cations replaced with $Ag^+$. The adsorbents are further characterized by limiting the excess Ag content to no more than 10%, and preferably no more than 5%, above the fully exchanged charge-balancing Ag cation capacity of the zeolite. In addition, the final moisture level of the zeolites is no more than 2.0 wt %, and preferably is 1.0 wt % or less. The adsorbents of the present invention exhibit hydrothermal structural damage of no greater than 15% and preferably no greater than 10%. Most preferably, the hydrothermal structural damage is no greater than 5%. Moreover, the dynamic working capacity or ΔCO of the adsorbents of the present invention is at least 0.045 mmol CO/g Ag-zeolite, more preferably $\geq$ 0.055 mmol/g and most preferably $\geq$0.065 mmol/g, as measured by a reference breakthrough test from which a dynamic working capacity of CO is determined.

Another aspect of the present invention is a method of making such improved adsorbents in which the following steps are used to produce adsorbents for large scale manufacture. Zeolites with Si/Al<10 are selected and exchanged to replace at least 80% of exchangeable cations with $Ag^+$. The Ag-exchanged zeolites (or Ag-zeolite) are washed sufficiently to eliminate excess Ag, Ag compounds and/or Ag salts or other exchangeable cations or impurities from the pores of the zeolite, with such excess Ag content being limited to no more than 10%, and preferably no more than 5% above the full charge-balancing Ag cation capacity of the zeolite. The zeolite is thermally dried and activated such that the exchanged zeolite achieves a final moisture level in the product of no more than 2.0 wt % and preferably achieves a final moisture level of 1.0 wt % or less. The thermal treatment is accomplished so as to minimize the hydrothermal structural damage to no greater than 15%, preferably no greater than 10% and most preferably, no greater than 5%. As a result, adsorbents can be consistently provided having a dynamic working capacity or ΔCO of the Ag-zeolite of at least 0.045 mmol CO/g Ag-zeolite. Preferably, the CO adsorptive capacity is 0.055 mmol/g, and most preferably $\geq$0.065 mmol/g, as measured by a reference breakthrough test from which a dynamic working capacity of CO is determined.

The adsorbent characteristics and methods of production described above maximize the working adsorption capacity of the zeolites and consequently allow for enhanced π-complexation by favoring adsorption over alternative catalytic and chemically reactive functionalities.

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION

Figure 1:
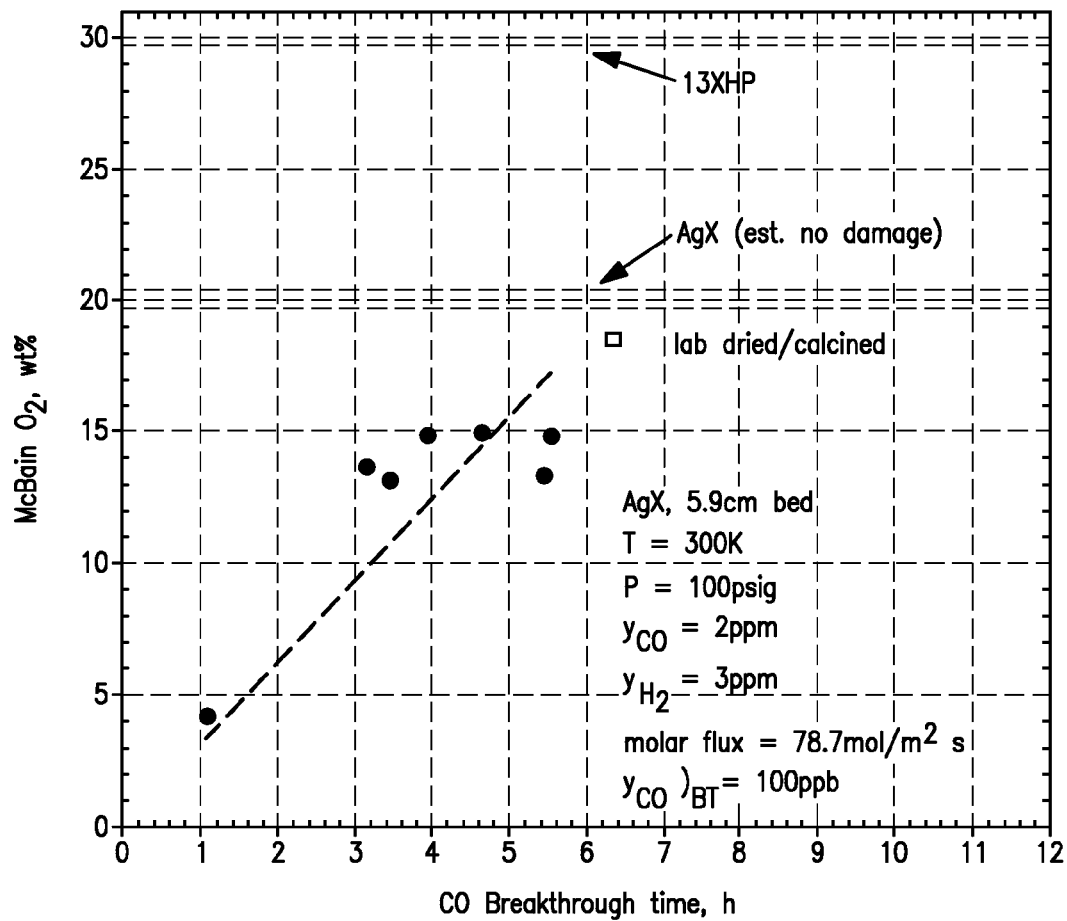
FIG. 1 illustrates the relationship between CO breakthrough time and McBain $O_2$ capacity based on the results of Examples 1-3.

Due to the high cost of Ag-exchanged adsorbents, it is important to maximize the performance for the intended contaminant removal. Furthermore, such maximized performance can be consistently realized through the specific methods of manufacture provided in the present invention.

The present invention is particularly effective in generating high purity and ultra high purity (UHP) gas streams using Ag-exchanged zeolites through removal and/or recovery of contaminants by π-complexation. For the purpose of the present invention, "high purity" means ≦100 ppb (parts per billion) contaminant in the purified gas product and "ultra high purity" or "UHP" means ≦10 ppb contaminant in the purified gas product. Limitations of the prior art are thus overcome to fulfill the practical need to produce industrial scale quantities of Ag-exchanged adsorbents exhibiting consistently high performance characteristics.

The Ag-exchanged zeolites of the present invention and methods of producing such adsorbents in industrial scale quantities recognizes and addresses certain limitations in the prior art. While not to be construed as limiting and while not intending to be bound by any theory, the present invention recognizes that: (1) CO is often removed from gas streams by catalytic oxidation (forming $CO_2$ as a byproduct) due to the relative ineffective adsorption resulting from very weak physisorption of CO in conventional adsorbents; (2) removing trace impurities from a gas stream to generate an ultra high purity product has been found to be particularly sensitive to increased mass transfer resistance due to adsorbent pore blocking by debris left from the ion exchange; (3) structural and chemical changes are affected by the method of processing, particularly in drying and activation, and adsorbents of the same general type can have quite different adsorption properties depending upon the method of processing; (4) while ion exchange of zeolites is a convenient and effective means of dispersing metal atoms uniformly, the various possible functionalities of a given type of zeolite such as catalytic activity, chemical reaction or adsorption may each dictate different thermal and/or chemical processing conditions to achieve the desired performance in the intended application; and (5) prior art teachings predominantly address methods of synthesizing or modifying zeolites in gram quantities rather than tens or hundreds of kilograms necessary for industrial use.

The present invention is aimed at adsorption, specifically chemisorption designed to promote π-complexation. Catalytic activity can be undesirable, its presence an indicator of adsorption sites converted to catalyst sites. In addition, catalytic conversion results in products that may require further removal to satisfy overall product purity requirements.

Metal cations and impurities in the zeolite may be transformed by oxidation, reduction or chemical reaction during thermal and/or chemical treatment so as to promote or enhance the overall catalytic potential of the zeolite. Such treatment may drive the metal atoms from the intracrystalline space and result in collapse of the micropores, thereby leaving a free metal or metal compound well dispersed and exposed on the surface of the collapsed zeolite. Such a result may significantly promote catalysis, yet severely retard adsorption.

Although it is known to wash the zeolite after ion exchange to remove excess salts, specific criteria for effective washing are seldom discussed in the prior art, particularly for industrial scale production. Furthermore, little attention has been given to the effects of macropore blocking in trace contaminant removal. Macropores in this context refer to the conduits for fluid transport (macropores and mesopores) formed within the agglomerated adsorbent particle. Such pores are in contrast to the micropores inside the zeolite crystal. When the macropores become obstructed, there is an increase in mass transfer resistance, i.e. slowing the transport of fluid from the bulk stream to the zeolite crystals. Shorter retention time of the contaminant in the adsorber, reduced working capacity and earlier breakthrough are consequences of macropore blocking.

As discussed hereinbelow and as shown in Examples 6 and 7, the washing process of the present invention minimizes obstruction of macropores of the agglomerated adsorbent particle while the drying and calcining process minimizes hydrothermal structural damage of the micropore zeolite crystal. In the case of trace contaminant removal, breakthrough is measured at the parts-per-billion (ppb) level. $H_2$ has been found to be an effective probe molecule for indicating the severity of macropore blocking.

Ag-exchanged zeolites may exhibit one or more functionalities (e.g., catalytic, gettering or adsorption) that can be effectively applied toward gas phase and/or liquid phase purification and separation. Usually, however, a particular separation application demands a specific functionality of the material. Such functionality directly relates to the amount, location and state of the Ag distributed in the zeolite. A specific and desirable functionality is largely promoted through the processing of the zeolite. As a result, different separation characteristics of the zeolite are the direct result of the method of processing. The finished product may also possess more than a single functionality, often to the detriment of the desired application.

The unique tendency toward clustering of Ag atoms in Ag-exchanged zeolites can leave the zeolite structure more sensitive to hydrothermal damage. This sensitivity must be managed through careful control of the thermal processing of the zeolite. Such control of the drying and activation of zeolite particles is more difficult to affect in large-scale manufacture. Vacuum thermal activation, commonly employed in laboratory (small-scale) processing, is less damaging to the zeolite, but is not practical for industrial-scale thermal treatment of zeolites. Without proper attention to the processing conditions, the material properties resulting from manufacturing are likely to be quite inconsistent and different than those obtained using laboratory methods.

The present invention, aimed at adsorption in Ag-exchanged zeolites through highly promoted π-complexation, escapes or minimizes the following limitations of the prior art: hydrothermal damage to the more sensitive Ag-zeolite structure; sensitivity of Ag cations to reduction by components such as $H_2$; retention of Ag salts, Ag compounds or other impurities deposited on the surface and within the macropores of the zeolite; and the inability to economically and consistently scale-up production from gram quantities to industrial scale quantities of adsorbents while maintaining the desired adsorbent characteristics through reproducible methods of manufacture.

The present invention identifies the properties of the Ag-exchanged zeolite adsorbent required to affect high working capacity of adsorbed gas phase components that form weak chemical bonds by π-complexation with Ag. A combination of factors is important in achieving the desired performance on a consistent and reproducible basis. As discussed above, selecting zeolites with high ion exchange capacity (Si/Al<10), exchanging with Ag to ≧80%, minimizing excess Ag and other impurities by proper washing after ion exchange and programmed thermal drying and activation (in the presence of a dry purge gas) to achieve a moisture content of 2.0 wt % or less can be important factors.

While not intending to be limiting, the present invention is particularly well suited for the removal of trace contaminants (active in π-complexation) where resistance to macropore diffusion and coadsorption of major gas phase components (e.g. $N_2$, $CO_2$, $O_2$, etc.) must be kept to a minimum and where high purity and ultra high purity (UHP) product is desired. Replacing catalytic oxidation with adsorption (for example, for the removal of CO from a gas stream) also eliminates products of reaction and offers the option to recover the adsorbed contaminant.

The use of the precious metal Ag in the highly exchanged zeolites of the present invention can result in a relatively high cost of adsorbent relative to conventional commercial adsorbents such as 13X, 5A and the like. By maximizing the working capacity of the exchanged adsorbent, however, less adsorbent may be required for any particular separation. Achieving such performance of the adsorbent by processing in commercial scale quantities provides an economy of scale that allows for improved competitive advantage through reduced amount of adsorbent and reduced overall capital cost. The Ag-exchanged adsorbents of the present invention are thus economically competitive with other separation methods by virtue of the high adsorption performance. Such materials are capable of high purity and ultra high purity separations, while other methods or materials may not have equivalent attributes.

As mentioned hereinabove, the Ag-exchanged zeolites of the present invention are aimed at adsorption of gases by π-complexation. Zeolites having Si/Al<10 are of particular interest because they can be made rich in charge balancing monovalent cations. Low Si/Al ratio combined with high Ag exchange level result in the greatest number of $Ag^+$ cations, and therefore, the greatest potential for π-bond formation. Faujasites (Types X and Y), Type A, clinoptilolite, mordenite and chabazite are attractive zeolite candidates. While Si/Al=1.0 provides the maximum number of cations, such materials are known to be less thermally stable during activation, e.g. low silica X (LSX), U.S. Pat. No. 4,544,378. Gas species that readily interact with Ag to form π-bonds include CO, $C_2H_4$ and $C_3H_6$ and the like. For purposes of this invention, adsorption performance is demonstrated using CO breakthrough tests. Production methods are carried out using commercial grade 13XHP as the raw material for subsequent exchange with Ag. 13XHP is NaX beads with a Si/Al=1.2-1.25 and is commercially available from UOP, Des Plaines, Ill. USA.

It has been found that the methods of processing the Ag-exchanged zeolite can be important to achieving maximum levels of π-bond interaction between the adsorbent and the contaminant(s) in the gas stream. Because there may be more than a single combination of processing conditions from which an adsorbent with the desirable properties can be produced, the success of the manufacturing procedures is determined on the basis of the adsorbent characteristics and performance. Such criteria have been developed in terms of micropore volume retention, Ag exchange level, moisture content and CO working capacity. The methods for determining these properties are given hereinbelow.

Maintaining maximum micropore volume within the zeolite is important when the primary application is gas separation by adsorption. Hydrothermal structural damage and loss of zeolite content result in a reduction in adsorption capacity. An effective measure of the micropore volume is the amount of oxygen adsorbed at low temperature and pressure using the McBain $O_2$ test method (see e.g., Bolton, A. P., "Molecular Sieve Zeolites," in *Experimental Methods in Catalytic Research*, Vol. II, ed. R. B. Anderson and P. T. Dawson, Academic Press, New York, 1976, incorporated herein by reference.

The zeolite sample is air dried to a free-flowing condition (usually just below $H_2O$ saturation) prior to the McBain test. It is then placed in the McBain apparatus and slowly dehydrated and activated under evacuation overnight, i.e. at a pressure of about $1 \times 10^{-4}$ torr. Activation occurs as the temperature is ramped from ambient to about 400° C. in eight hours and then held at this temperature for an additional eight hours. The sample is then cooled to liquid $N_2$ temperature (77K) and ultra high purity $O_2$ is introduced and maintained at a pressure of 70 torr until equilibrium is reached. The amount of $O_2$ adsorbed (wt %) is determined gravimetrically through an accurate measurement of the change in length of a calibrated helical spring.

The McBain $O_2$ test is a more effective and quantitatively superior method than conventional X-ray diffraction for determining structural damage. Although the test is often used to determine the fractional zeolite content of a bound zeolite relative to its unbound crystalline powder analog, it is applied here as a measure of absolute micropore volume represented by wt % $O_2$ adsorbed. Comparing the micropore volume (i.e., McBain $O_2$, wt %) before and after drying/activation provides a means of identifying damage to the zeolite structure incurred during the drying/activation step. This eliminates the need to compensate for varying amounts of binder for zeolites of the same structure, as well as developing separate criteria for various structural types having different characteristic micropore volumes. As a result, a common criteria for Ag-exchanged zeolites of the present invention is to limit structural damage to a maximum of 15% (preferably 10% or less) during thermal activation (interpreted as % reduction in micropore volume as determined by McBain $O_2$ capacity). Alternatively, 85% or more of the micropore volume (determined after ion exchange and prior to drying) is to be retained after thermal processing.

Ion exchange of various zeolites with Ag may be performed using any number of methods as known in the prior art. Some ion exchange examples are provided in PCT international publication No. WO 03/101587 entitled Production of High Purity and Ultra-High Purity Gas, the entire contents of which are incorporated herein by reference. To provide the most effective adsorbents for π-complexation, the zeolite should be exchanged with $Ag^+$ as close to 100% of the exchangeable cation capacity as possible. Any excess Ag beyond this amount is to be minimized as addressed below. For the examples of the present invention, ion exchange was performed using the following procedure.

The desired amount of raw material (in the example, 13XHP beads from UOP) is loaded into a production column and wetted with deionized water. A second column is similarly loaded and serves as a scavenge column to minimize the amount of Ag in the wastewater. A 0.1M to 1.0M $AgNO_3$ solution is circulated slowly through the first column and then into and through the scavenge column from which it exits into a storage tank. After completing the exchange of the initial batch, the scavenge column becomes the production column. Solutions of varying concentration are reused from the storage tank (always insuring that subsequent exchanges on a given column are performed at increasing $AgNO_3$ concentration), thereby minimizing the amount of waste solution for disposal. The series of continuous exchanges performed at ambient temperature (as described above for the production column) are terminated when the $AgNO_3$ concentration in the effluent solution from the production column reaches the inlet concentration. An elevated temperature exchange is then initiated by filling the column with a 1.0M to 5.0M fresh solution of $AgNO_3$ and the column is heated to 40° C.-80° C. Upon reaching the desired temperature, the heaters are turned off and the production column is allowed to cool for about 30 min. The exchange solution is drained and deionized water is introduced to begin the washing. The deionized water is added to cover the zeolite in the column (about $0.51 H_2O/l$ solid) and held for a time period ranging from a minimum of 10.0 min to 30 min. The wash water is drained or alternatively sent to a scavenge column if the $AgNO_3$ concentration is high enough for recycle as exchange solution. Production methods for Example 1 included batch washes repeated 2-3 times resulting in a total volume of wash water equal to 1.0-1.5 times the volume of the solid adsorbent until the $AgNO_3$ concentration is <0.02M.

The above description for ion exchange is not limiting and other methods known in the art are acceptable, e.g. the use of other Ag salts and various concentrations of these salts. Limiting the contact time of the zeolite with the exchange solution and the degree and effectiveness of the wash after ion exchange were found to be important considerations beyond that typically found in the prior art. Calzaferri, et al. (Chem. Soc. Rev., 2003, v32, 29-37) have noted that excess contact time with the Ag salt solution can even "damage the morphology of the crystals." For the purpose of this invention, it has been found that excessive contact time (days or longer) promotes retention of Ag and other exchangeable cation compounds within the pores of the zeolite particle. High concentrations of exchange solutions may also attack the zeolite framework over time. Since the base zeolites of this invention generally favor Ag over other cations, the exchange of Ag may usually be affected within a few hours or less.

The effectiveness of the washing influences the rate of uptake of the adsorbates, particularly in trace contaminant adsorption aimed at producing gases of ultra high purity. The prior art often recites a general guideline for washing zeolites exchanged with water-soluble ions, i.e. "wash sufficiently to remove excess salts of the exchange solution." Sometimes it is suggested that the exchanged ion content be measured in the wash solution until it is no longer detected. However, such criteria can be qualitative and ignore the possible plugging of the macropores with the salts of the replaced ion and do not adequately account for the effects of incomplete ion exchange, adsorbent particle size and slow dissolution from the pores. For bench-scale ion exchange, very large ratios of wash water to solid can be achieved without high cost of the deionized water or waste disposal. For industrial scale production of the materials of this invention, washing efficiency affects adsorption performance and cost of the final product. Variations to the washing procedure described above are noted in the examples below.

In accordance with the present invention, establishing the washing criteria from adsorption performance to minimize macropore blockage is preferred over that determined from the measurement of $Ag^+$ concentration in the wash water. While not to be construed as limiting, the total volume of deionized water used can be at least 3 times the volume of solid adsorbent following its exchange with Ag. This may be approximately 6 repeated batch washes of the zeolite.

After washing, liquid should be drained from the Ag-exchanged zeolite. The adsorbent should then be air-dried to remove surface water until the adsorbent is free flowing in preparation for activation. An air or inert dry gas purge, at a temperature of 20° C. to about 60° C., may also be applied to reduce drying time. This pre-drying process can usually be completed in one to several hours. The solid may be spread out in a single layer of particles or continuously mixed to allow exposure to the drying environment for free and rapid evaporation of the surface moisture. Removing as much moisture as possible in a reasonable time facilitates the final activation that follows. Neither shallow nor deep bed drying/activation are recommended for production of kg amounts of adsorbents typical of this invention.

As discussed herein, activation involves heating the adsorbent to a much higher temperature in order to remove most of the remaining moisture and to stabilize the state and location of the Ag. Since spreading large amounts of adsorbent in a single layer can require large amounts of processing area, some form of solid mixing or conveying can be used during the thermal activation process. This solid motion is important to establish frequent contact with the heated air or inert gas purge in order to sweep moisture away from the zeolite surface and promote diffusion of water vapor out of the adsorbent pores. Water must be desorbed while minimizing any hydrothermal damage to the zeolite structure. The prior art often teaches vacuum desorption during thermal activation. While quite effective in minimizing loss of micropore volume during activation, evacuation is only practical when processing very small quantities of adsorbent and is not economically feasible for industrial scale production as addressed by the present invention. The most important factors for activation are integral mixing of the solid with the purge gas, heating of the solid and gas, low dew point of the gas purge and drying time. Successful combinations of these variables are identified through the characteristics and performance of the processed adsorbent.

The activation conditions have been varied in some of the examples below to demonstrate the importance of these process conditions. Thermal drying and activation process conditions resulting in minimal hydrothermal damage and moisture content of 2.0 wt % or less for Ag-exchanged zeolites include: (1) after air drying at ambient temperature (moisture content of zeolite at or below saturation), the temperature of the zeolite is increased at a maximum rate of 1.0° C./min (preferably 0.5° C./min or less) up to 150° C., where the adsorbent is held for at least 30 min, preferably 1.0 h to 3.0 h; (2) prior to heating the zeolite above 150° C., the moisture content of the zeolite should be a maximum of 8.0 wt %, preferably 5.0 wt % or less; (3) the temperature of the zeolite is then increased at a maximum rate of 2.0° C./min (preferably 1.0° C./min or less) up to 300° C. to 400° C., preferably to 350° C.; (4) during the above heating steps, a dry air or inert gas purge is to be in direct contact with the well mixed zeolite, continuously flowing at a rate of 1.0 $Nm^3/h$ to 2.0 $Nm^3/h$ per kg of dehydrated Ag-exchanged zeolite; and (5) a dew point of the purge gas less than or equal to 10° C., preferably less than −10° C. and most preferably less than −30° C.

These drying and activation conditions were applied to the production of AgX (70 kg to 100 kg batches), continuously mixing in a 0.5 m³ double conical rotating mixer. While this combination of conditions was applied to successfully achieve the desired moisture content and retained micropore volume, such process conditions are enabling but not limiting. These processing conditions can serve to guide one skilled in the art to determine other appropriate processing conditions, i.e. when taken in combination with the CO working capacity, retained micropore volume, moisture content and Ag-exchange level of the processed zeolite. For example, a different combination of processing conditions may be required for processing other Ag-exchanged zeolite types, for smaller or larger batches of zeolite and for implementing alternate types of process equipment.

The desired characteristics of the Ag-exchanged zeolites of this invention are obtained through the efficient and economic production (batch or continuous) of Ag-exchanged zeolites in 50 kg or larger quantities. The methods described herein apply also to smaller quantities, e.g. 10 kg to 50 kg, but economics favor production in the range of 50 kg-100 kg or larger. Each piece of equipment required in the processing is to be of sufficient size to contain the quantities stated above, e.g. ion exchange bed, oven or activation unit each capable of containing at least 50 kg of final product. Batch processing is most appropriate in this production size range, with a production time of two days or less per batch desirable and one day per batch most desirable. Much higher production levels (1000 kg-20,000 kg/day) could favor the use of continuous processing or combination of batch and continuous processing using equipment designed and scaled for this purpose. Nevertheless, the methods described herein generally apply to both batch and continuous processing. Highly Ag-exchanged zeolites in accordance with the present invention represent both a high performance and high-value product, and batch processing often provides the most cost-effective means of production.

The most important characteristics of the Ag-exchanged zeolite that closely reflect the processing conditions while simultaneously representing the ability of the adsorbent to affect π-complexation with receptive adsorbates are the retained micropore volume, Ag exchange level, moisture content and CO working capacity. The fraction of retained micropore volume is determined by the McBain $O_2$ test as described above. The amount of Ag in the agglomerated adsorbent may be determined by Inductively Coupled Plasma Atomic Emission Spectroscopy (ICP) or by the Fire Assay method. Except where noted otherwise, the Ag Assay method is used and the Ag assay results (reported as wt % Ag) presented herein were performed by Hazen Research, Inc., of Golden, Colo. See also, Bugbee, *A Textbook of Fire Assaying*, Third Edition, John Wiley & Sons, New York, 1940 incorporated herein by reference. The moisture content is determined using a Mettler DL18 Karl Fisher Titrator, commercially available from Mettler-Toledo International, Inc. Such methods are known by those skilled in the art.

The general concept and method of a breakthrough test is also well known to those skilled in the art. For the purpose of this invention, the breakthrough or working capacity (ΔCO) is determined from an overall mass balance of the CO in the feed and effluent streams at a CO breakthrough concentration of 100 ppb. The dynamic working capacity of the CO adsorbate is established here to represent the ability of the adsorbent to remove contaminants by π-complexation while simultaneously incorporating coadsorption and kinetic effects inherent in real processes. It is expected that the adsorbates (particularly atmospheric gases) will be completely thermally desorbed from the adsorbents in thermal swing adsorption processes (TSA). Under such conditions Equation (1) represents the CO working capacity (ΔCO):

$$\Delta CO = \frac{m_{in}}{w_s} \int_0^{t_b} (y_{in} - y_{out}) dt \qquad (1)$$

where $m_{in}$ is the molar feed flow into the bed, $y_{in}$ and $y_{out}$ are the inlet and outlet mole fractions of CO, respectively, $w_s$ is the mass of adsorbent and $t_b$ is the breakthrough time corresponding to a predetermined breakthrough concentration (100 ppb CO). Determined with a CO concentration reduction ratio of 2.0 ppm/0.1 ppm=20, the working capacity inherently captures the kinetic effects resulting from mass transfer resistance. For the purpose of the present invention, the primary component in the feed gas of the breakthrough test is $N_2$. Since the concentration of $N_2$ in the feed stream is overwhelming compared to that of CO, the coadsorption effect of CO upon $N_2$ is negligible. Conversely, the coadsorption of $N_2$ may have a significant effect upon the adsorption of CO. The breakthrough test method as described is preferred for establishing the working capacity for CO since $N_2$ and $O_2$ coadsorption, $H_2$ reduction and mass transfer effects are automatically incorporated in the resultant CO loading. Thus, the best adsorbent is one that exhibits high CO working capacity (long breakthrough time) in the presence of such inhibiting factors.

The working capacity of CO was determined in this way from a CO breakthrough test and was used as a reference indicator of the ability of the adsorbent to form π bonds. The conditions of the test were carefully selected to critically evaluate adsorbents for the desired adsorption capability under realistic process conditions. The reference breakthrough test was performed at 7.9 bara (114.7 psia), 10° C. and an inlet gas flow rate of approximately 21 slpm (78.7 mol/m² s) using an adsorption column length of 5.9 cm. The feed gas included 2.0 ppm CO, 3.0 ppm $H_2$, 79% $N_2$ and 21% $O_2$. The corresponding CO partial pressure at which the CO working capacity is determined is $2.3 \times 10^{-4}$ psia (0.012 mmHg). Details of this test are given in PCT international publication No. WO 03/101587, the entire contents of which are hereby incorporated herein by reference. Any variations to these reference conditions are noted in the following examples.

EXAMPLE 1

Samples of commercially available AgX zeolites were obtained from Aldrich Chemical Co., Inc. of Milwaukee, Wis. (C__0) and Molecular Products, Inc. (C*CHEM Division), located in Lafayette, Colo. (C__1-C__5) as shown in Table 1. These materials are advertised as $H_2$ getters for use in vacuum spaces (e.g. as described in U.S. Pat. No. 3,108,706), for catalyzing $H_2/O_2$ reactions and for removal of halogens from gas streams. Received as (10×16) beads, the average diameter of these zeolites was between 1.4 mm and 1.5 mm. The samples C__1-C__5 represent different production lots, all dried and activated as part of their original processing. However, samples C__2, C__3 and C__4 were all received with moisture content greater than 2.0 wt %. Because of the high Ag wt %, these zeolites are quite expensive, e.g. more than $200/kg. The Ag wt %, moisture content and McBain $O_2$ were measured using the methods referenced above and are provided in Table 1.

TABLE 1

Commercial AgX Zeolites

| Adsorbent | Moisture wt % | Ag wt % | McBain O$_2$ wt % | $t_b$ @100 ppb CO h | ΔCO mmol/g |
|---|---|---|---|---|---|
| C_0 (38,228-0) | NA | 36.0* | 14.8 | 5.4 | 0.052 |
| C_1 (Ag400) | 0.5 | 38.0 | 13.3 | 5.5 | 0.051 |
| C_2 (Ag400) | 2.1 | 37.2 | 14.9 | 4.7 | 0.044 |
| C_3 (Ag400) | 2.3 | 37.4 | 14.8 | 4.0 | 0.038 |
| C_4 (Ag400) | 2.3 | 38.2 | 13.6 | 3.2 | 0.031 |
| C_5 (Ag400) | 1.2 | 37.0 | 4.2 | 1.2 | 0.012 |

*determined by ICP method, all others determined by Ag assay

In sampling a cross-section of only five individual production lots of AgX representing prior art production methods, it is quite apparent from the breakthrough time, ΔCO working capacity and the McBain O$_2$ results in Table 1 that the quality and consistency of the prior art AgX is highly variable. This variation, as much as a factor of four or more, creates an unacceptable burden in designing to a minimum performance to guarantee contracted product purity to the customer. Achieving and maintaining an overall competitive advantage (as derived from the high performance of such an expensive adsorbent) requires the production of the adsorbent with consistently high CO working capacity.

A sample of each material was packed into a bed 5.9 cm long and dried prior to CO breakthrough testing to reduce moisture content to less than 1.0 wt %. Moisture levels greater than 1.5 wt % to 2.0 wt % interfere with the adsorption of CO. This drying was performed using a dry N$_2$ (<−50° C. dew point) purge flow of 13.6 slpm while the temperature was slowly ramped from ambient to 350° C. and then held at 350° C. overnight. After cooling under the same purge to ambient temperature, a CO breakthrough test was performed at 27° C., all other conditions being as stated above in the description of the breakthrough test.

It is noted in this Example and the Examples that follow that irreversible reactions were observed in the first exposure to the feed composition (possibly from reactions with impurities or excess Ag compounds resulting from incomplete washing after exchange), so the first breakthrough test is discarded. The results of the second and subsequent breakthrough tests were found to be reproducible and thus were used to calculate the CO working capacity. CO and other adsorbed impurities are removed after a breakthrough test by regenerating the adsorbent bed in dry air (<−50° C. dew point) at a temperature varying from 175° C. to 275° C. for 2.0 h and cooling in dry N$_2$ for 3.0 h, all at 2.0 slpm. The CO working capacity, determined from Equation (1), is given in Table 1.

EXAMPLE 2

Several samples of commercially available 13XHP (10× 20) zeolite beads (89429-556P-lot no.) were obtained from UOP of Des Plaines, Ill. 13XHP is a synthetic NaX zeolite with a Si/Al ratio of approximately 1.25. The McBain O$_2$ capacity for a pure binderless NaX with the same Si/Al is approximately 33 wt % to 34 wt %, while the average O$_2$ capacity of the bound zeolites of Table 2 is 29.65 wt %. The initial step of heating/evacuation in the McBain O$_2$ test thoroughly dries the sample and eliminates any effects of moisture upon the O$_2$ adsorption. The relative difference in the McBain O$_2$ (or difference in micropore volume) between the bound 13XHP and the pure NaX powder indicates that the commercial starting material (13XHP) contains approximately 10 wt % to 12 wt % binder.

The weight fraction of Ag in a fully exchanged AgX can be computed from the well-known structure and composition of the pure dehydrated NaX zeolite (Bolton), i.e. starting with NaX and exchanging essentially all of the 85-86 Na$^+$/unit cell with Ag$^+$. Accounting for the binder content of the 13XHP, the amount of Ag in a fully exchanged 13XHP zeolite is approximately 39 wt % (dehydrated basis).

A CO breakthrough test was conducted with one of the 13XHP samples using a 5.9 cm long packed bed at a feed temperature of 10° C. and otherwise at the conditions and procedures described above in Example 1. 13XHP (NaX) zeolite has essentially no capacity for CO at low CO concentration, i.e. CO breaks through 13XHP immediately as shown in Table 2.

TABLE 2

Characteristics of Unexchanged 13X Base Zeolite

| Adsorbent | Lot No. | McBain O$_2$ Wt % | $t_b$ @100 ppb CO h |
|---|---|---|---|
| 13XHP | 2010004827 | 30.18 | N/A |
| 13XHP | 2010006043 | 29.50 | N/A |
| 13XHP | 2012005651 | 29.77 | N/A |
| 13XHP | 2012005900 | 29.14 | immediate |

The results of Examples 1 and 2 indicate the Ag content of the samples in Example 1 represents a minimum equivalent of 92.3% Ag exchange, e.g. for sample C_0 in Table 1, the Ag content=(36 wt %/39 wt %)×100=92.3%. Since the AgX zeolites of Example 1 have significant zeolite damage, such level of exchange exists only in the diminished undamaged zeolite fraction of the adsorbent, i.e. the damaged fraction of the zeolite is characterized by a collapsed micropore structure that is inaccessible to CO molecules.

Even though the micropore volume should be relatively unaffected by the replacement of Na$^+$ by Ag$^+$, the McBain O$_2$ wt % will be different for the NaX and AgX zeolites due to the difference in adsorbent density. The adsorbent particle density (as well as the bulk packed density) of the AgX is approximately 1.48 times that of NaX as can readily be determined from the known compositions of both the NaX and AgX adsorbents. The expected O$_2$ capacity for fully exchanged AgX can be estimated from the range of McBain O$_2$ data for 13XHP in Table 2, i.e. 29.14/1.48=19.7 wt % to 30.18/1.48=20.4. (The sample standard deviation for a McBain reference adsorbent with an average O$_2$ capacity of 36.66 wt % is 0.17 wt %). Clearly, the results show that all of the prior art production samples of AgX of Example 1 suffer more than 25% loss of micropore volume (presumed here to be due to hydrothermal damage). The results of Examples 1 and 2 demonstrate that a high level of Ag exchange alone does not insure high CO working capacity, but that high Ag exchange must be obtained simultaneous with minimum destruction of the zeolite micropore volume.

This example also establishes three important baselines: (1) the average amount of adsorbed O$_2$ (representing the micropore volume of the base zeolite) of four production lots of the bound 13XHP adsorbent is 29.65 wt %; (2) the amount of Ag in a fully exchanged 13XHP adsorbent is 39 wt %; and (3) the average amount of adsorbed O$_2$ (representing the micropore volume of fully exchanged AgX) is 20.4 wt %.

EXAMPLE 3

Samples of commercial AgX from a sixth production lot (C_6) were obtained from Molecular Products, Inc.

(C*CHEM division). C_6 (received with a moisture content of 1.9 wt %) was produced by the same methods as samples C_1 through C_5. A second sample (C_7) was prepared in the laboratory using the same 13XHP base zeolite, ion exchange solutions and procedures as in the production of C_6 up through the completion of the ion exchange and washing steps, i.e. prior to any thermal treatment. A portion of this C_7 sample (50-100 g) was then air dried at ambient conditions. A standard 5.9 cm bed was then packed with this material (about 11.5 g), placed in a tube furnace and purged at 13.6 slpm with dry $N_2$ while simultaneously increasing the temperature (1° C./min) to 150° C. and holding for several hours. Sample C_6 was also placed in a standard 5.9 cm bed. Both C_6 and C_7 beds were then activated at 350° C., followed by CO breakthrough tests performed at 27° C., using the same procedures described in Example 1. The results of these tests are summarized in Table 3. Breakthrough tests were also conducted on sample C_7 with the $H_2$ concentration in the feed reduced from the normal 3.0 ppm to about 200 ppb with negligible effect upon the CO capacity. The moisture content of both samples after activation and prior to breakthrough testing was <1.0 wt %.

TABLE 3

Effect of Drying/Calcination on CO Performance

| Adsorbent | Moisture wt % | Ag wt % | McBain $O_2$ wt % | $t_b$ @100 ppb CO h | ΔCO mmol/g |
|---|---|---|---|---|---|
| C_6 (Ag400) | 1.9 | 37.0 | 13.1 | 3.5 | 0.033 |
| C_7 | >15* | 37.0 | 18.5 | 6.4 | 0.060 |

*moisture content after ambient drying, reduced to 0.3 wt % $H_2O$ after lab activation.

The McBain $O_2$ results of these two samples indicate the amount of micropore volume destroyed in sample C_6 due to the production scale calcination process, i.e. % loss in micropore volume=(1−(13.1/18.5))×100=29.2%, i.e. 70.8% retained $O_2$ capacity. The relationship between CO breakthrough time and McBain $O_2$ capacity, derived from the results of Examples 1, 2 and 3, is shown in FIG. 1. The McBain $O_2$ tests are conducted on the adsorbents "as received," although a "gentle activation" is performed as part of the preconditioning associated with the McBain test. In this example, C_6 represents an adsorbent fully processed using a prior art production method. C_7 represents the adsorbent processed through the same ion exchange and washing process as C_6, but only C_6 was activated by the production method. The CO adsorption capacity is strongly affected by the amount of micropore volume lost to hydrothermal damage. By using the relative loss in $O_2$ capacity (loss in micropore volume) as a measure of zeolite damage (rather than an absolute value of $O_2$ capacity), simple criteria can be established for the drying and calcination processes that can be applied to any Ag-exchanged zeolite of this invention, e.g. AgA, AgY, AgX, etc. This is accomplished as demonstrated in Table 3 by measuring the $O_2$ capacity before and after the drying/calcination steps in the process. This determines the effect of the thermal processing regardless of the type of zeolite, amount of binder or any prior thermal damage from processing of the base starting material.

EXAMPLE 4

Industrial scale batch production was initiated by first exchanging 13XHP (10×20) (Lot no. 2010004827) with Ag and washing with deionized water using the procedure described above, i.e. the same procedure used in commercial production of AgX such as for the materials of Example 1. The amount of calcined AgX produced in each batch varied between 80 kg and 90 kg.

After draining the water from Batch R_906, the zeolite was placed in trays (shallow bed depth of several cm), placed in a vented (but not purged) oven and the temperature was set at 260° C. The adsorbent was removed after about an hour and placed in a 0.5 $m^3$ double conical rotating mixer. The temperature of the adsorbent in the mixer was controlled initially to increase at about 0.25° C./min up to 175° C. and at about 0.6° C./min from 175° C. to 345° C.

Figure 2:
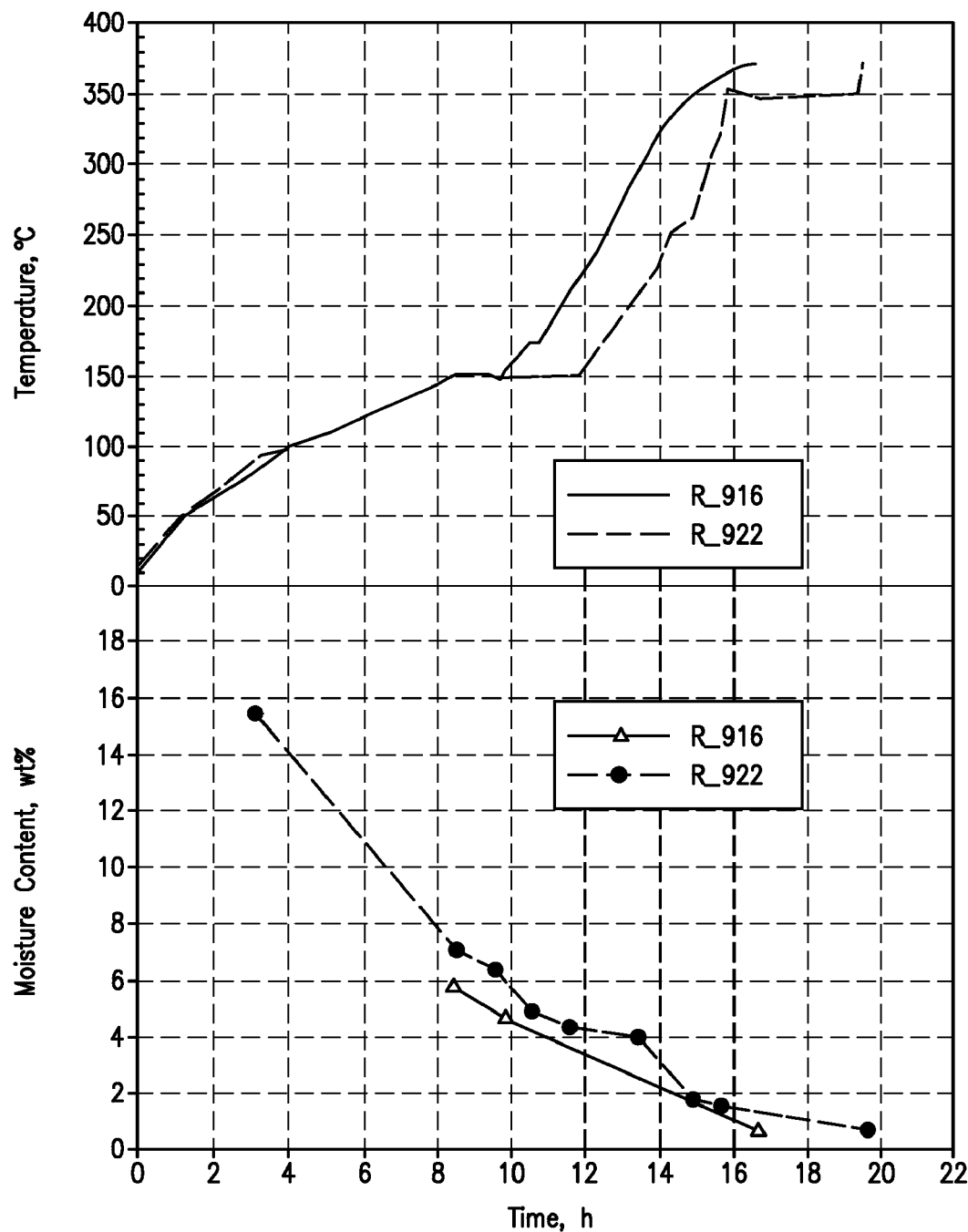
FIG. 2 illustrates the heating and drying rates of the adsorbents from Batches R_916 and R_922 in Example 4.

Batches R_916 and R_922 were drained and each placed directly in the mixer prior to calcination. The heating profiles for these batches, shown in FIG. 2, are similar except that the dwell time at 150° C. was extended from 1.0 h for R_916 to 2.0 h for R_922. The adsorbent is heated indirectly to a final temperature of 370° C. from electrical elements contained within the mixer. The adsorbent does not contact the heating elements. A continuous ambient air purge was supplied to the mixer at a rate of about 100 $Nm^3$/h for all three batches. The moisture and amount of Ag and the $O_2$ capacity were measured at the end of thermal processing using the methods already described. CO breakthrough tests were performed at 10° C., otherwise using the conditions and the procedure described in Example 1.

The shallow bed oven heating without purge for R_906 resulted in a significant loss in micropore volume. This loss in micropore volume is reflected in both the McBain $O_2$ result and the CO breakthrough time shown in Table 4.

Avoiding the static oven and introducing continuous mixing of the solid with purge while controlling the heating rate resulted in a AgX adsorbent with little or no loss in micropore volume and a superior CO working capacity and breakthrough time. In fact, the CO capacity of R_916 is from two to eight times higher than that of the commercial samples of Example 1. Samples of adsorbent were removed from the mixer at different temperatures in the heating cycle. The moisture content of these samples was measured. The heating and drying rates of the adsorbents (Batches R_916 and R_922) are shown in FIG. 2. This moisture level/temperature combination represents a successful guide to drying and calcining with minimal hydrothermal damage to the zeolite.

The lower Ag wt % of R_922 represents an exchange of about 84% of the exchangeable $Na^+$ cations in the zeolite. The resulting CO breakthrough time is substantially lower, due in part to the reduced amount of $Ag^+$ cations. The higher apparent $O_2$ capacity is consistent with the lower density of the incompletely exchanged adsorbent.

TABLE 4

Industrial Scale Batch Production Results

| Adsorbent | Moisture wt % | Ag wt % | McBain $O_2$ wt % | $t_b$ @100 ppb CO h | ΔCO mmol/g |
|---|---|---|---|---|---|
| R_906 | 0.6 | 37.0 | 11.7 | 3.0 | 0.030 |
| R_916 | 0.6 | 39.9 | 20.9 | 9.5 | 0.101 |
| R_922 | 0.7 | 32.6 | 21.5 | 4.2 | 0.045 |

EXAMPLE 5

Six batches (each resulting in 79 kg to 91 kg calcined AgX) were processed from 13XHP (Lot No. 2010004827) using the same equipment, conditions and the procedures described in Example 4 for Batch R_916. The average particle size of the finished product was 1.5 mm, while the batch moisture content varied from 0.85 wt % to 1.57 wt %. The Ag content or exchange level varied from 93% to 101% of the exchangeable cations (based upon 39 wt % Ag representing 100% Ag exchange). The moisture content of the ambient air purge used in the drying/calcination step was not controlled and varied according to the ambient relative humidity. The retained amount of $O_2$ capacity (as determined by measuring the McBain $O_2$ capacity before and after drying/calcination) also varied, i.e. the zeolite reached temperatures above 150° C. while retaining excess moisture resulting in varying levels of hydrothermal damage. CO breakthrough tests were conducted on 5.9 cm long packed beds at a feed temperature of 10° C. and otherwise at the conditions and procedures described above in Example 1. The retained $O_2$ capacity is shown as a function of CO breakthrough time in FIG. 3. The trend of increasing CO capacity with increasing micropore volume retention is similar to that shown in FIG. 1.

A drier was installed and the moisture content of the ambient air purge was controlled to less than −10° C. dew point at an air flow rate to the mixer of 135 Nm³/h. Ten batches (each resulting in 74 kg to 105 kg calcined AgX) were processed from 13XHP (Lot No. 2012005900) using the same equipment, conditions and the procedures described in Example 4 for Batch R_916 except as noted herein. The average particle size of the finished product was 1.4 mm, while the batch moisture content varied from 0.62 wt % to 0.98 wt %. The Ag content varied from 94% to 106% (based upon 39 wt % Ag representing 100% Ag exchange). For the purposes of this invention, Ag content ≦100% represents the level of $Ag^+$ exchange, i.e. percent of exchangeable cations in the zeolite replaced by $Ag^+$. For Ag content >100%, the Ag amount above 100% represents Ag in excess of that required for a fully exchanged zeolite, such excess undesirably present in the pores or otherwise deposited on or within the zeolite adsorbent. CO breakthrough tests were conducted as described above in this example. The retained $O_2$ capacity is shown as a function of CO breakthrough time in FIG. 3.

The introduction of an adequate flow of dry air purge (intimately contacting the solid adsorbent) in combination with a controlled heating schedule clearly achieves high micropore volume ($O_2$ capacity) retention. There is greater than 90% $O_2$ capacity retained (<10% loss in micropore volume due to calcination) in all of the ten batches and more than 95% $O_2$ capacity retained in nine of those ten batches. Nevertheless, there still exists a large difference between the lowest and highest CO breakthrough times once the loss in micropore volume has been minimized through proper control of the drying\calcination conditions, i.e. from about 5.0 to 9.0 hours.

EXAMPLE 6

Figure 3:
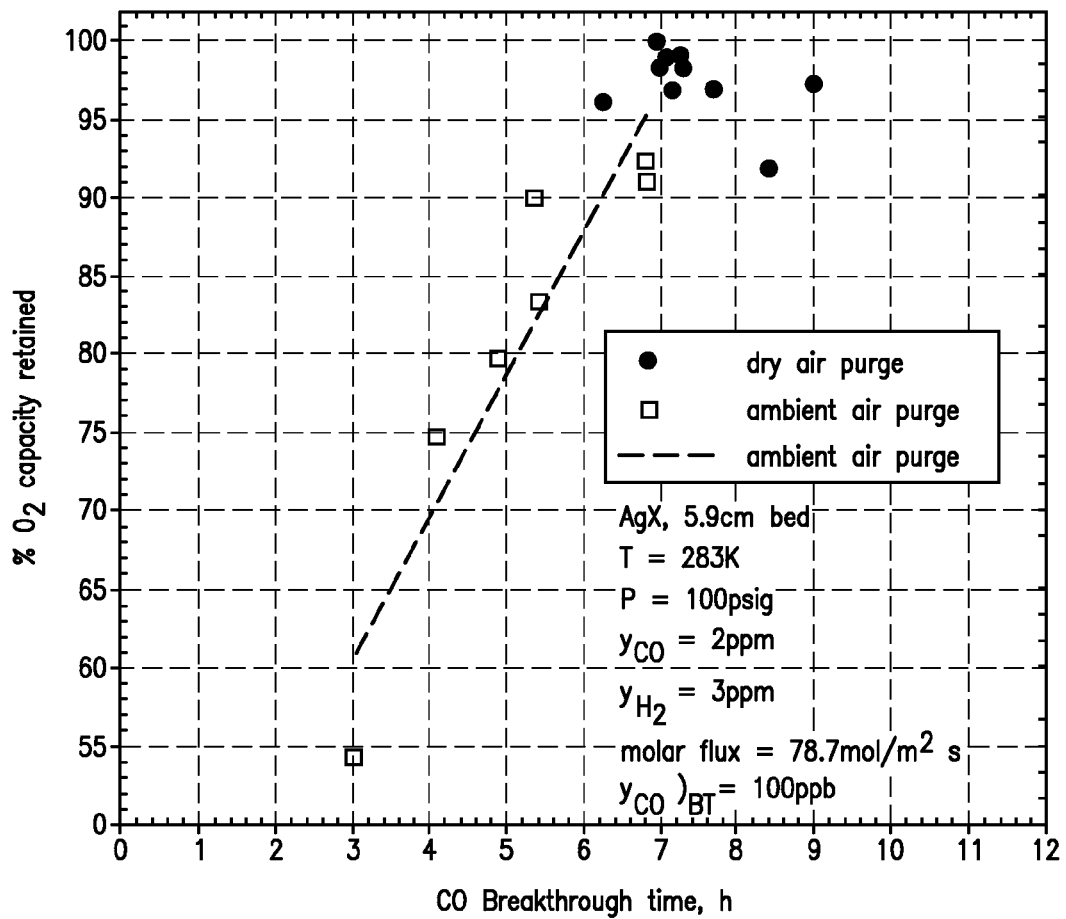
FIG. 3 shows the retained $O_2$ capacity as a function of CO breakthrough time

While particle size, moisture content and measurement error may all contribute to varying CO breakthrough time and CO capacity, none of these factors (within their range of variation in this invention) explain the variation of CO breakthrough times from about 5.0 h to 9.0 h in FIG. 3, i.e. for retained $O_2$ capacity ≧90%.

A series of three consecutive production batches processed from 13XHP (Lot No. 2010006043), each producing about 75 kg of finished product, resulted in low performance, i.e. CO breakthrough times ranging from 4.5 h to 5.1 h. These batches had been partially exchanged with Ag when the ion exchange process was interrupted. The partially exchanged adsorbent was drained of exchange solution and sealed in drums for about a week before being reloaded into the exchange columns to complete the exchange process. The worst performing of these batches (R_956) was used to investigate the effect of additional washing upon CO performance. This particular batch had a larger average particle size (1.8 mm) than the typical production lots (1.4 mm to 1.5 mm) and lost approximately 10% of its $O_2$ capacity in thermal activation. Both of these factors (larger particle size and loss of micropore volume) contribute to lower overall CO working capacity.

A Ag-exchanged sample was extracted from this production batch prior to thermal activation and subjected to additional washing (bench scale) with deionized water (R_956_a). To insure complete washing, the zeolite sample was washed three times with excess water. The total amount of water from all three washes was approximately 100 times the volume of zeolite sample. A sample of the fully processed production batch was also taken after thermal activation, carefully rehydrated to saturation and washed similarly (R_956_b), i.e. with excess water volume approximately 100 times the zeolite sample volume.

After the bench-scale washing, samples R_956_a and R_956_b were dried and activated using the same procedure as that described in Example 3 for sample C_7. CO breakthrough tests were conducted on 5.9 cm long packed beds at a feed temperature of 10° C. and otherwise at the conditions and procedures described in Example 1. The results for the samples subjected to extra washing are compared with those of the regular production lot R_956 in Table 5. Each CO breakthrough time in Table 5 represents the average of two tests, with a maximum variation between test pairs of 0.2 h. The extra washing of the fully processed zeolite (R_956_b) resulted in only modest improvement in CO capacity. However, the additional washing provided immediately prior to thermal activation (R_956_a) resulted in more than double the CO capacity of the fully processed zeolite.

TABLE 5

Effect of Additional Washing upon CO Performance: Production Scale

| Adsorbent | Moisture wt % | Ag wt % | McBain $O_2$ wt % | $t_b$ @100 ppb CO h | ΔCO mmol/g |
|---|---|---|---|---|---|
| R_956 (1) | 0.9 | 37.9 | 19.3 | 4.5 | 0.045 |
| R_956_a (2) | NA | NA | NA | 9.2 | 0.089 |
| R_956_b (3) | NA | NA | NA | 5.5 | 0.053 |

(1) full production, sample tested directly
(2) production ion exchange, sample rewashed and dried in laboratory prior to testing
(3) full production, sample rewashed and redried in laboratory prior to testing The extensive washing immediately after ion exchange (R_956_a) results in CO capacity near the maximum shown in FIG. 3, while the same level of washing performed only after thermal activation (R_956_b) gives only a modest improvement in CO capacity. The CO breakthrough characteristics shown in FIG. 4 clearly indicate the effect of washing upon the mass transfer resistance. The two sets of washing experiments confirm that only a fraction of the water-soluble material remains soluble after thermal treatment.

Figure 4:
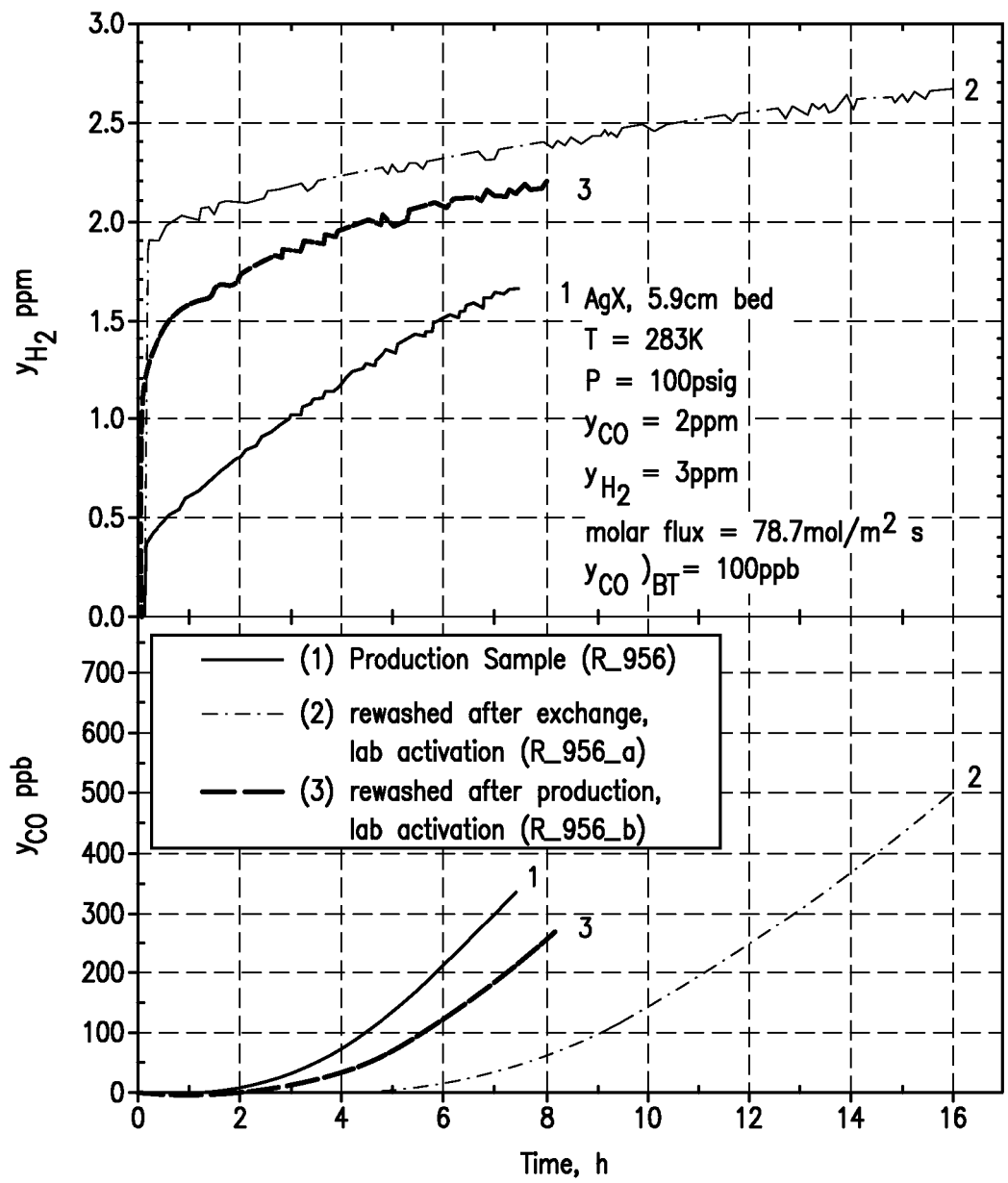
FIG. 4 illustrates CO and $H_2$ breakthrough characteristics of Example 6 and indicates the effect of washing upon the mass transfer resistance.

Evidence of the pore blocking mechanism is apparent in the level of $H_2$ activity on the various samples as shown in FIG. 4. The greatest $H_2$ holdup corresponds to the earliest CO breakthrough. An immediate breakthrough of $H_2$ to 3.0 ppm represents 0 holdup, while lower $H_2$ concentrations in the effluent represents higher levels of the $H_2$ retained in the adsorbent, i.e. "$H_2$ holdup". The varying levels of $H_2$ holdup are believed to be the result of interaction with impurities in the pores. Excess salt ($AgNO_3$), free Ag, $Ag_2O$ and other impurities in the pores react with $H_2$ (resulting in the observed increased $H_2$ holdup as evidenced by lower levels of $H_2$ breakthrough), corresponding to the simultaneous reduced CO working capacity due to slow mass transfer. In this case, $H_2$ serves as an indicator or probe of blocked pores, although the additional $H_2$ holdup is not the cause of the poorer CO performance.

Incomplete washing can manifest itself in several other problems such as incomplete drying, low CO diffusion rates and retention of excess Ag or Ag compounds that may produce undesirable catalytic reactions. Not wanting to be limited to any particular theory, it is believed that the performance improvement observed after the additional washing provides valuable insight toward maximizing the π-complexing ability of the adsorbent. The washing must be adequate to clean out the excess $AgNO_3$ salt deposits in the macropores (and possibly micropores) of the zeolite from the ion exchange. The residual salt (excess Ag and the reverse-exchanged Na or other resident cations in the starting zeolite) is generally removed by washing with clean deionized water, although the amount of water required may not be adequately determined by the concentration of Ag in the waste wash water.

Since the ions must diffuse out of the zeolite structure and particle, diffusion time is dependent upon the size of the zeolite particles. Variations in particle size, amount of wash water, washing time and exchange time result in inconsistent removal of residual salts (incomplete washing) from the exchanged zeolites. The salt-blocked pores subsequently also impede the removal of water from the zeolite during thermal treatment, resulting in varying levels of residual moisture in the end product. A large fraction of any water-soluble salt left in the pores after exchange may melt at temperatures reached during calcination and be dispersed and impregnated as free Ag or $Ag_2O$ on the walls of pores. The blocked pores also decrease the diffusion rate of CO and influence the effective mass transfer rate and mass transfer zone (MTZ) of the dynamic removal process, i.e. reducing the dynamic CO capacity (shorter breakthrough time). It appears that the secondary mechanism inhibiting optimum CO capacity is the blockage of zeolite pores with residual salts from the exchange process. Thus, proper washing after exchange is important to maximizing the π-complexing ability of the adsorbent.

EXAMPLE 7

The AgX production lots of Example 5 typically required from two to three batch washes. Each batch wash used a volume of deionized water equal to about 50% of the volume of solid zeolite being washed. Washing was terminated according to the criteria described in the general ion exchange procedure given above, i.e. until the $AgNO_3$ concentration in the effluent wash water is <0.02M. Accordingly, the total volume of deionized water used in two to three batch washes equaled 1.0 to 1.5 times the volume of solid adsorbent, i.e. far less than the excess water used in Example 6.

In order to determine if reasonable amounts of additional washing in production could improve performance, two lots of AgX (each representing about 75 kg calcined product) were processed from 13XHP (Lot No. 2012005900). This material was subjected to six batch washes following the ion exchange step. The total volume of deionized water used was approximately three times the volume of solid adsorbent. Except for the additional washing, the adsorbent was processed as described in Example 5 using the dry air purge procedure. The average particle size of the finished product was 1.4 mm. The Ag-exchange level ranged from 99% to 100.5% of the exchangeable cations. Approximately 95% of the $O_2$ capacity was retained after thermal activation for both production lots.

CO breakthrough tests were conducted on 5.9 cm long packed beds at a feed temperature of 10° C. and otherwise at the conditions and procedures described above in Example 1. The average CO breakthrough times are summarized in Table 6. Comparing with the production data in FIG. 3, these lots using additional washing resulted in near-maximum CO breakthrough time. Thus, establishing the washing criteria from the adsorption performance to minimize macropore blockage is preferred over that determined from the measurement of $Ag^+$ concentration in the wash water.

TABLE 6

Effect of Additional Washing upon CO Performance: Production Scale

| Adsorbent | Moisture wt % | Ag wt % | McBain $O_2$ post wash wt % | McBain $O_2$ post calcine wt % | Avg. $t_b$ @ 100 ppb CO H | ΔCO mmol/g |
|---|---|---|---|---|---|---|
| R_1016 | 0.6 | 39.2 | 21.3 | 20.2 | 8.9 | 0.089 |
| R_1017 | 0.5 | 38.6 | 21.7 | 20.5 | 9.1 | 0.089 |

EXAMPLE 8

TABLE 7

Summary of AgX Production Campaigns

| Production Campaign | No. of Batches | $t_b$ @100 ppb CO h | $\sigma_{tb}$ | ΔCO mmol/g |
|---|---|---|---|---|
| 1 | 20 | 6.5 | 1.5 | 0.060 |
| 2 | 10 | 7.4 | 0.77 | 0.069 |
| 3 | 18 | 7.6 | 1.0 | 0.071 |

Several production campaigns were conducted in which multiple batches of AgX were produced and the results are shown in Table 7. The first production campaign included twenty batches of AgX, each batch producing from 70 to 100 kg AgX. CO breakthrough tests were conducted for each AgX batch in each production campaign using 5.9 cm long packed beds at a feed temperature of 10° C. and otherwise at the conditions and procedures described above in Example 1. The average CO performance results for each of the first three production campaigns are summarized in Table 7. The lowest average ΔCO loading and the highest variability (standard deviation determined for breakthrough time, $\sigma_{tb}$) occurred in the first production campaign (1). Part of this campaign was conducted with an ambient air purge prior to the installation of a purge drier. Post ion-exchange washing conditions, purge flow, calcination temperature programming and purge dew point were being investigated and adjusted throughout the first production campaign as reflected in Examples 4-6. Production campaigns (2) and (3) were conducted under much better control of the drying/calcination step using the methodology of the present invention. These latter two campaigns included ten and eighteen batches, respectively, each batch producing an amount of AgX within the same range given above for the batch of production campaign (1). The resulting ΔCO loading is significantly higher and more consistent for production campaigns (2) and (3) (lower variability) compared to the production campaign (1).

The above examples show that the Ag-exchanged adsorbents of the present invention represent a considerable improvement in adsorption separation performance over currently commercial adsorbents. Relative to the reference dynamic CO capacity, the highest performing AgX adsorbents of this invention have up to twice the adsorption capacity of the best commercial AgX materials and nearly eight times the capacity of the worst performing commercial AgX adsorbents. Such improvements are obtained from the unique combination of the following: (1) select zeolites with Si/Al<10 and exchange to replace at least 80% of its exchangeable cations with $Ag^+$; (2) wash sufficiently to eliminate excess Ag, Ag compounds or salts of impurities or other exchangeable cations from the pores of the zeolite, such excess Ag content limited to no more than 10%, preferably no more than 5% above the full exchangeable charge-balancing cation capacity of the zeolite; (3) thermally dry and activate the exchanged zeolite to achieve a final moisture level in the product of no more than 2.0 wt % (preferably 1.0 wt % or less); (4) thermal treatment to be carried out so as to minimize the hydrothermal structural damage to no greater than 15% (preferably no greater than 10% and most preferably no greater than 5%) as determined by the McBain $O_2$ capacity; (5) the integrated effects of the above processing to result in a dynamic working capacity of the Ag-zeolite of at least 0.045 mmol CO/g Ag-zeolite (preferably 0.055 mmol/g and most preferably ≧0.065 mmol/g) as measured by a reference breakthrough test from which a dynamic working capacity of CO is determined.

As discussed above, the present invention provides Ag-exchanged zeolites to maximize their potential for enhanced adsorption of the appropriate molecules through the formation of weak chemical π bonds with Ag. Zeolites with Si/Al ratios <10 are preferred because of their high exchange capacity for Ag. Examples of zeolite types having this characteristic include X, Y, A, mordenite, clinoptilolite, chabazite, etc. Both natural and synthetic zeolites may be considered.

Because of the diverse structures represented by these zeolites, there will be a corresponding variation in micropore volume as defined by $O_2$ capacity. The largest absolute micropore volume (and its corresponding zeolite structure) does not in itself define the best base material for exchange with Ag, or ultimately as the best adsorbent for π-complexation. For base materials of a given structural type that have already been thermally treated prior to exchange with Ag, however, those having the highest $O_2$ capacity are preferred.

While several commercial synthetic zeolites are readily available with Na as the charge-balancing cation, zeolites having other cations may be used as the starting zeolite. Typical cations that may be present in the base material prior to exchange with Ag are Na, Li, K, Mg, Ca, and the like, either alone or in combination.

The base material (starting zeolite prior to exchange) may be an agglomerate, an extrudate, bead or in granular form with or without binder. The average size of such agglomerates may be from about 0.4 mm to 4.0 mm. The base zeolite may also be a powder at the time of exchange with Ag with subsequent forming into agglomerates as indicated above or for dispersal on or into a substrate to create a membrane, monolith or other structural form to be used as a gas separator.

Since weak chemical bonds provide the primary mechanism for adsorption, separation processes that incorporate thermal regeneration are preferred for desorption of the adsorbed components. However, separation processes utilizing the adsorbents of this invention may include the thermal swing, pressure swing or displacement means (simulated moving bed (SMB)) and combinations thereof for regeneration of the adsorbent. Although the adsorbents of this invention are well suited for use at feed gas temperatures in the range of −50° C. to about 50° C. (e.g., the typical temperature range in which most feed gas streams are purified), higher or lower temperatures are not excluded depending upon the separation. Likewise, there are no particular limits upon the operating pressure, although pressures in the range of 0.1 atm to 20 atm would be most typical.

The adsorbents of this invention are best suited for the removal of contaminant gases from gas streams wherein the contaminant gases are particularly receptive to forming weak chemical bonds with the $Ag^+$ cation in the zeolite through π-complexation. The most common gases that will interact with Ag in this manner are carbon monoxide (CO), ethylene ($C_2H_4$) and propylene ($C_3H_6$), although other appropriate molecules will bond similarly.

Both purification and bulk separations may be affected by the adsorbents of this invention. The removal of CO from air, $N_2$, $H_2$, inert gases or mixtures of these gases are examples of purification. These adsorbents are particularly effective in removing trace contaminants (ppm (parts per million) levels to 0.5 vol % in the feed stream) to the ppb levels required for production of high purity and ultra high purity gases. The high selectivity and working capacity of Ag-exchanged adsorbents make these materials ideal for adsorbing contaminants from air by π-complexation when the concentrations in air are 10 ppm, e.g. CO in air. Examples of bulk separations include recovery of CO from synthesis gas and the separation of olefins from paraffins where the concentration of the most strongly adsorbed component in the feed stream is ≧1.0 vol %. Finally, liquid phase separations such as water purification and hydrocarbon solvent recovery are potential applications for these adsorbents.

The high working capacity of the Ag exchanged zeolites (e.g. ΔCO ≧0.045 mmol/g) of this invention facilitate the use of thin adsorbent layers. This is beneficial in limiting the overall cost of separation using expensive adsorbents and where space is limited in either small adsorbers or in retrofitting of existing adsorbers with limited excess space.

Ag-exchanged zeolites with Si/Al<10 may become partially or fully deactivated by $H_2O$ in gas phase separations, although this can be reversed by proper thermal activation or drying. In contrast, these same adsorbents are particularly effective in removing gases forming weak π-bonds in the presence of other gases that generally are coadsorbed through weak to moderately strong physisorption, e.g. $N_2$, $O_2$, $CO_2$, etc. The adsorbents of this invention are also resistant to reduction (e.g. $H_2$) and oxidation of the $Ag^+$ cation.

Figure 5:
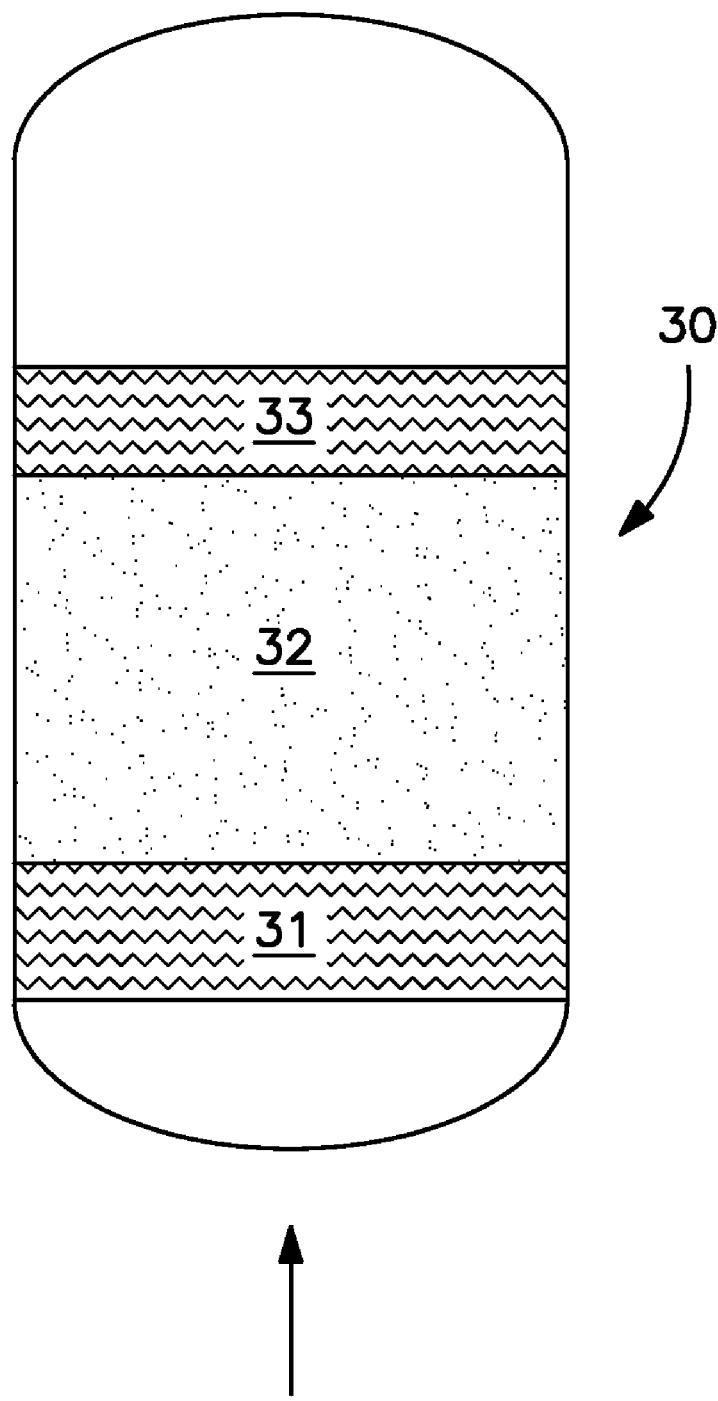
FIG. 5 is a schematic diagram of an exemplary adsorbent arrangement in an adsorbent vessel/bed in accordance with the present invention.

The present invention can be used in a TSA adsorber and system for the removal of CO concentration and, optionally the removal of one or more of: $H_2O$, $CO_2$, and $H_2$ from an incoming feed stream. An exemplary vessel design suitable for removal of CO and optionally, other contaminants, is described below with reference to FIG. 5. The arrow as shown in FIG. 5 indicates the direction of gas flow through the adsorber bed/vessel during the purification step of the process. A TSA prepurifier system incorporating such a vessel is disclosed below with reference to FIG. 6.

Referring again to FIG. 5, vessel 30 is shown. Vessel 30 optionally contains a first layer of $H_2O$ adsorbent (31) such as alumina, silica gel or molecular sieve or mixtures thereof to remove substantially all of the $H_2O$ entering vessel 30. A second layer (32) of $CO_2$ adsorbent such as 13X (NaX) or 5A or mixture of these is optionally used to remove substantially all of the $CO_2$. The $CO_2$ adsorbent layer can also remove any residual water remaining from the $H_2O$ adsorbent layer (31). A third layer (33) of CO adsorbent is placed downstream of the $CO_2$ adsorbent. (By the term "downstream", it is meant closer to the effluent or product end of the adsorber vessel.) It will be appreciated by those skilled in the art that vessel 30 can be used with adsorbent layer 33 alone. A substantially $H_2O$-free and $CO_2$-free gas stream enters this CO adsorbent layer. The CO adsorbent layer is formed of a CO adsorbent of the present invention. Alternatively, adsorbent layer (33) is a mixture of a CO adsorbent of the present invention with another material. Such mixtures are described in copending, commonly owned U.S. application Ser. No. 11/170,109, entitled "Adsorbent and Catalyst Mixtures", filed on even date, herewith by Ackley. The entire contents of copending, commonly owned U.S. application Ser. No. 11/170,109, entitled "Adsorbent and Catalyst Mixtures", filed on even date, herewith by Ackley are incorporated herein by reference.

It will be appreciated that additional layers above layer 33 or below layer 31 can be added for adsorption or catalysis as shown in PCT publication No. 03/101587, entitled "Production of High Purity and Ultra-High Purity Gas".

In accordance with the present invention, existing prepurifiers can be easily retrofitted using the adsorbents of the present invention. An illustrative process is described herein with reference to FIG. 6. Feed air is compressed in compressor 70 and cooled by chilling means 71 prior to entering one of two adsorbers (76 and 77) where at least the contaminants $H_2O$, $CO_2$ and CO are removed from the air. The adsorbers 76 and 77 each have the same adsorbent bed configuration, which may, for example be one as described with reference to FIG. 5 above. The purified air exits the adsorber and then enters the air separation unit (ASU) where it is then cryogenically separated into its major components $N_2$ and $O_2$. In special designs of the ASU, Ar, Kr and Xe may also be separated and recovered from the air. While one of the beds is adsorbing the contaminants from air, the other is being regenerated using purge gas. A dry, contaminant-free purge gas may be supplied from the product or waste stream from the ASU or from an independent source to desorb the adsorbed contaminants and thereby regenerate the adsorber and prepare it for the next adsorption step in the cycle. The purge gas may be $N_2$, $O_2$, a mixture of $N_2$ and $O_2$, air or any dry inert gas. In the case of thermal swing adsorption (TSA), the purge gas is first heated in heater 82 prior to being passed through the adsorber in a direction countercurrent to that of the feed flow in the adsorption step. TSA cycles may also include a pressure swing. When only pressure swing adsorption (PSA) is utilized, there is no heater.

Figure 6:
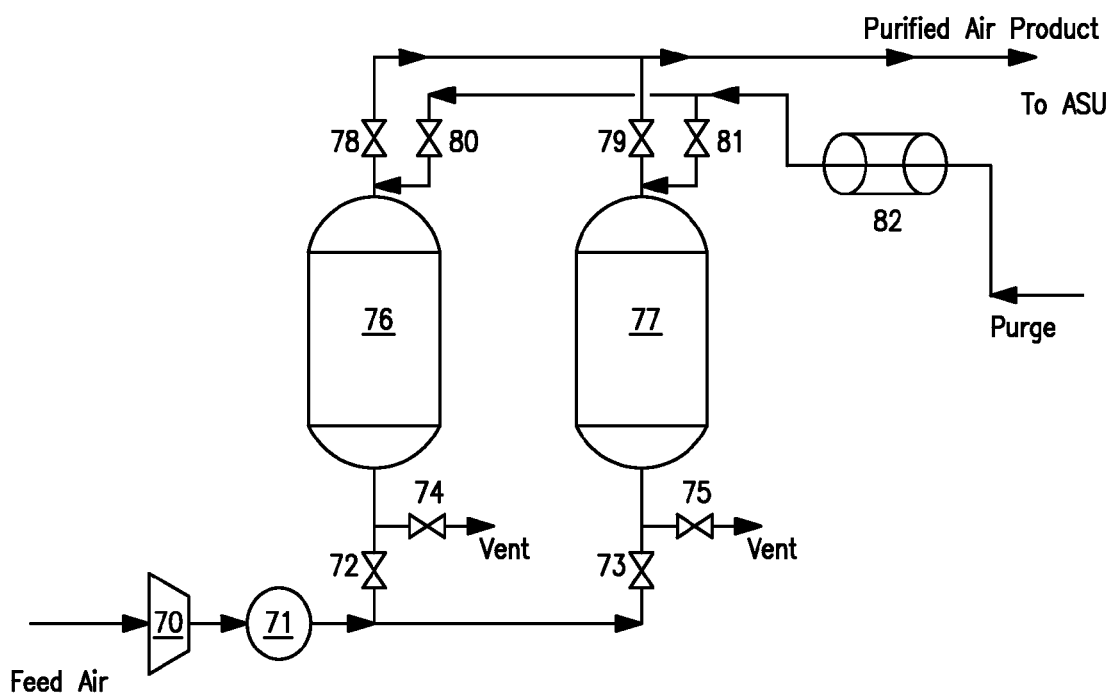
FIG. 6 is a schematic diagram of a prepurification apparatus suitable for use in accordance with the present invention.

The operation of a typical TSA cycle is now described in reference to FIG. 6 for one adsorber 76. One skilled in the art will appreciate that the other adsorber vessel 77 will operate with the same cycle, only out of phase with the first adsorber in such a manner that purified air is continuously available to the ASU. The operation of this out-of-phase cycle is indicated with reference to the numbers in parentheses.

Feed air is introduced to compressor 70 where it is pressurized. The heat of compression is removed in chilling means 71, e.g. a mechanical chiller or a combination of direct contact after-cooler and evaporative cooler. The pressurized, cool and $H_2O$-saturated feed stream then enters adsorber 76 (77). Valve 72 (73) is open and valves 74 (75), 78 (79) and 80 (81) are closed as the adsorber vessel 76 (77) is pressurized. Once the adsorption pressure is reached, valve 78 (79) opens and purified product is directed to an ASU for cryogenic air separation. When the adsorber 76 (77) has completed the adsorption step, valves 78 (79) and 72 (73) are closed and valve 74 (75) is opened to blow down the adsorber 76 (77) to a lower pressure, typically near ambient pressure. Once depressurized, valve 80 (81) is opened and heated purge gas is introduced into the product end of the adsorber 76 (77). At some time during the purge cycle, the heater is turned off so that the purge gas cools the adsorber to near the feed temperature or optionally, the cool purge is provided directly to the vessel through a bypass.

One of ordinary skill in the art will further appreciate that the above description represents only an example of a typical prepurifier cycle, and there are many variations of such a typical cycle that may be used with the present invention, for example as shown in PCT publication No. 03/101587.

As used herein, the $\Delta CO$ working capacity is determined from a reference breakthrough test performed at the following test conditions: 7.9 bara (114.7 psia), 10° C. and an inlet gas flow rate of approximately 21 slpm (78.7 mol/m² s) using an adsorption column length of 5.9 cm. The feed gas includes 2.0 ppm CO, 3.0 ppm $H_2$, 79% $N_2$ and 21% $O_2$. The $\Delta CO$ working capacity is determined from the results of the breakthrough test using Equation (1) and a CO breakthrough concentration of 100.0 ppb.

As also used herein, the phrase the "Ag content" means the total amount of Ag present in the agglomerated adsorbent relative to the amount required for complete replacement of all of the exchangeable cations with Ag. The $Ag^+$ cation capacity (fully exchanged) is first determined in terms of a wt % Ag for the agglomerated adsorbent of interest. For example and while not to be construed as limiting, a fully exchanged AgX using a 13XHP base has a $Ag^+$ cation capacity equivalent to 39 wt % Ag. This equivalent wt % capacity varies with type of zeolite, as well as with its binder content. The "Ag content" is then determined from the measured amount of Ag in the final Ag-exchanged adsorbent product as follows:

$$\text{Ag content} = \left[ \frac{\text{wt \% Ag in zeolite (by fire assay or } ICP)}{\text{wt \% Ag corresponding to zeolite fully exchanged with Ag}} \right] \times 100$$

By the phrase "hydrothermal structural damage" it is meant:

$$\% \text{ Hydrothermal Damage} = \left[ 1 - \frac{McBainO_2 \text{ wt \% of Ag-exchanged zeolite after calcination}}{McBainO_2 \text{ wt \% after Ag exchange and washing}} \right] \times 100$$

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method of making an adsorbent, the method comprising:
   providing a zeolite material having Si/Al<10;
   replacing at least 80% of exchangeable cations in the zeolite with $Ag^+$;
   washing the exchanged zeolite sufficiently to eliminate excess Ag, Ag compounds and/or salts of impurities or other exchangeable cations from the pores of the zeolite; and
   thermally treating and activating the exchanged zeolite such that the exchanged zeolite achieves a final moisture level in the zeolite of no more than 2.0 wt % and hydrothermal structural damage of no greater than 15%, wherein the zeolite has a $\Delta CO$ working capacity of at least 0.045 mmol CO/g Ag-zeolite, the $\Delta CO$ working capacity determined from a reference breakthrough test.

2. The method of claim 1, wherein the Ag content is between 80-110%.

3. The method of claim 2, wherein the Ag content is between 80-105%.

4. The method of claim 1, wherein the final moisture level in the zeolite is no more than 1.0 wt %.

5. The method of claim 1, wherein the adsorbent is a CO adsorbent.

6. The method of claim 1, wherein the ratio of total volume of water to volume of the zeolite used for the washing step is at least 3.

7. The method of claim 1, wherein the thermal treatment is accomplished so as to minimize the hydrothermal structural damage to the zeolite to no greater than 10%.

8. The method of claim 7, wherein the thermal treatment is accomplished so as to minimize the hydrothermal structural damage to the zeolite no greater than 5%.

9. The method of claim 1, wherein the Ag-exchanged zeolite has a $\Delta CO$ working capacity of at least 0.055 mmol CO/g Ag-zeolite.

10. The method of claim 9, wherein the Ag-exchanged zeolite has a $\Delta CO$ working capacity of at least 0.065 mmol CO/g Ag-zeolite.

* * * * *